March 16, 1954  F. LEE  2,672,058
FEEDING APPARATUS FOR MANURE SPREADING VEHICLES
Filed Nov. 8, 1950  2 Sheets-Sheet 1
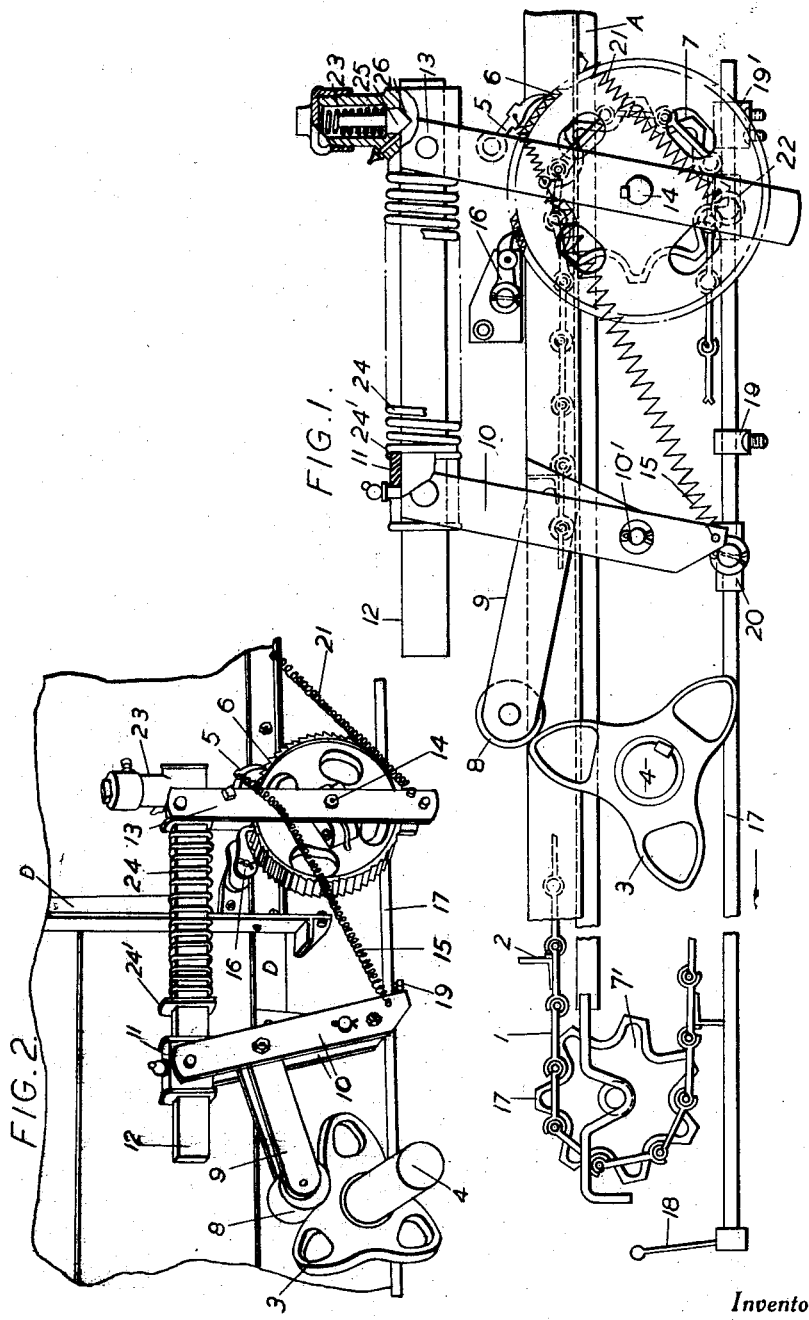
Inventor
FRANCIS LEE
By March 16, 1954   F. LEE   2,672,058
FEEDING APPARATUS FOR MANURE SPREADING VEHICLES
Filed Nov. 8, 1950   2 Sheets-Sheet 2
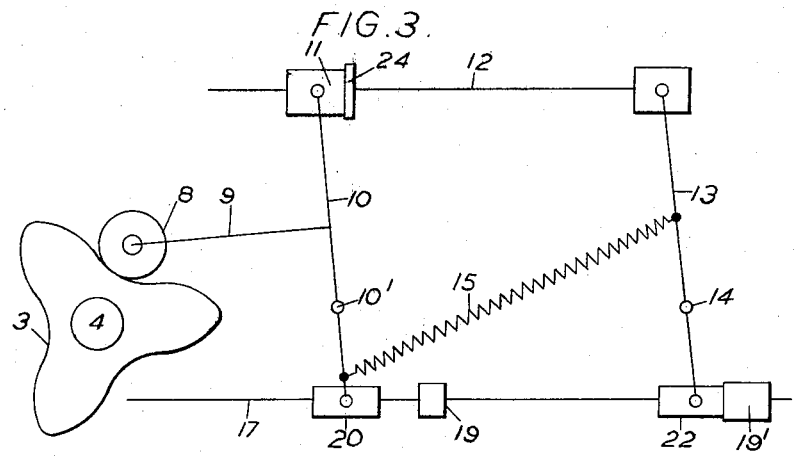
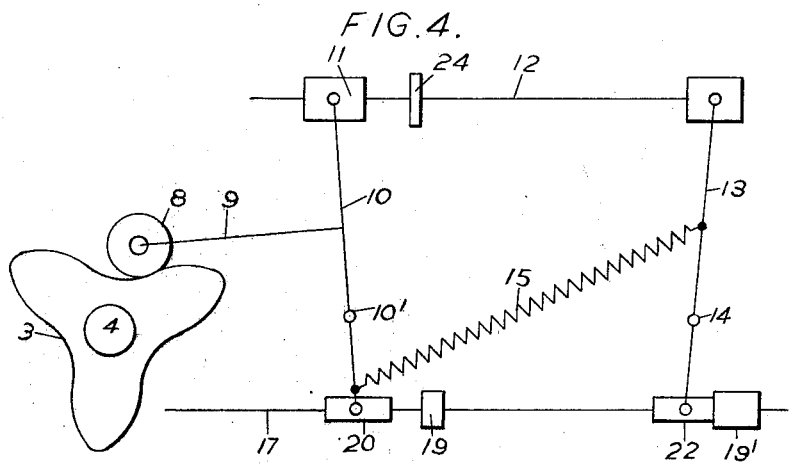
Inventor
FRANCIS LEE
By Patented Mar. 16, 1954

2,672,058

UNITED STATES PATENT OFFICE 2,672,058

FEEDING APPARATUS FOR MANURE SPREADING VEHICLES

Francis Lee, Stretford, England, assignor to Massey-Harris Limited, Stretford, England, a body corporate of Great Britain Application November 8, 1950, Serial No. 194,616

6 Claims. (Cl. 74—124)

This invention relates to improvements in apron chain feeds for agricultural machines for spreading manure of the type in which an apron traverses the floor of the vehicle to transfer the manure from the front thereof towards the rear to be picked up by rotary paddles or spreaders.

The object of the invention is to provide an adjustable drive for the apron in which the cam roller remains in contact with the cam throughout its rotation the feed being varied by altering the effective stroke of the lever actuated by the roller.

According to the invention the apron is driven intermittently by a pair of spring connected pivoted levers operating a ratchet and pawl mechanism, the first lever being rocked by a roller arm engaging a three lobed cam driven by the road wheels, and actuating the second lever through a slide pivoted to one end of the first lever and engaging a stop on a bar pivoted to the second lever.

The invention will be described with reference to the accompanying drawings:

Fig. 1 is a side elevation of the apron drive,

Fig. 2 is a perspective view of same,

Fig. 3 is a diagrammatic view showing the levers and control rod set for maximum feed of the apron, Fig. 4 is a similar diagrammatic view showing the levers and control rod set for a reduced feed of the apron.

Two endless chains 1 connected by angle bars 2 forming the apron travel along the bottom or floor of the trailer D. The chains pass over a chain sprocket 7¹ at the forward end of the trailer and over a chain sprocket 7 at the tail end driven intermittently by a multi-lobed cam 3 mounted on a spindle 4 driven from the road wheels which may be also mounted on the spindle 4. A roller 8 mounted on arms 9 engages the cam track on the cam 3. The arms 9 are bolted between two levers 10 connected together and pivoted to the body of the trailer D by a bolt 10¹, the levers 10 carrying at their upper end a slide 11 sliding on a bar 12. The opposite end of the bar 12 is pivotally connected to a second lever 13 pivoted on a spindle 14 on which is keyed a ratchet wheel 6 and the chain sprocket 7. A stop 24' slidable on bar 12 abuts against coil spring 24. The other end of coil spring 24 is connected with lever means 13. The levers 10, 13 are also connected by a spring 15, one end of which is secured to the lower end of the lever 10 and the other end to the upper portion of the lever 13, to maintain the roller 8 in contact with the cam track. The levers 10, 13 are strengthened by being formed in pairs bolted together the members of each pair being on opposite sides of the roller 8 and the ratchet wheel 6 respectively.

As the cam rotates the roller 8 rises and falls and transmits motion to the upper end of the lever 10 which actuates the lever 13 through the coil spring 24 by engaging stop 24' with slide member 11. A pawl 5 is mounted on the lever 13, engaging the ratchet wheel 6 and by which it is intermittently rotated as the cam 3 rotates.

A similar pawl 16 may be mounted on the trailer D to prevent the ratchet wheel 6 from moving in the reverse direction.

The lever 10 is pivoted at its lower end to a sleeve or collar 20 capable of sliding on a control rod 17 actuated by a ratchet handle 18 over a quadrant or otherwise. Movement of the control rod 17 in the direction of the arrow Fig. 1 to bring a stop 19 on the rod 17 into engagement with the collar 20 raises the roller 8 out of engagement with the cam 3 when the apron is not required to travel.

The control rod 17 also passes through a guide sleeve or collar 22 pivoted on the lower end of the lever 13. A second stop 19¹ is provided on the rod 17 by which the stroke of the bar 12 may be set as shown in Fig. 4 and to prevent the rod 17 from being withdrawn from the sleeve or collar 22.

To set the lever 10 for maximum stroke the sleeve or collar 22 is moved along the control rod 17, with the roller 8 on one of the lowest portions of the cam 3, to allow the stop 24¹ on the rod 12 to engage the slide 11. The stop 19¹ is then brought into contact with the sleeve 22 as shown in Fig. 1 and locked to the rod 17 by set screws or otherwise. The levers 10 and 13 will remain substantially parallel on the rotation of the cam to actuate the bar 12 to rotate the ratchet wheel 6.

In order to reduce the stroke of the bar 12 to lessen the feed of the ratchet wheel 6 the control rod 17 is moved in the direction of the arrow Fig. 1 to bring the stop 19¹ towards the front of the vehicle to restrict the rearward movement of the lever 13 thereby allowing the sleeve 11 to move away from the stop 24¹ under the action of the spring 15 whilst the roller 8 remains in contact with the cam 3. As the cam rotates the slide 11 moves up the bar 12 until it engages with the stop 24¹ and then moves the rod 12 as above described to rotate the ratchet wheel 6 but to a lesser amount than previously. During the actual actuation of the bar 12 the levers 10 and 13 are substantially parallel and operate as a parallelogram motion.

When the sleeves or collars 20 and 22 move on the control rod 17, the rod 17 flexes to allow for the transverse motion caused by the sleeves or collars moving in an arcuate path.

The roller 8 is retained in contact with the cam 3 by the spring 15, a second spring 21 connected between the lever 13 and the trailer body D returning the lever 13 after actuation by the bar 12.

The roller 8 is in contact with the cam 3 at all times during feed and the amount of feed is controlled by the position of the control rod 17.

A spring operated safety device may be provided to allow the bar 12 to slide without operating the lever 13 against the action of a spring 24 to stop the feed of the chain apron 1 should this latter become overloaded or frozen to the bottom of the trailer. The safety device comprises a spring controlled plunger 25 engaging a notch 26 in the rod 12.

What I claim is:

1. An operating arrangement for a conveyor, comprising in combination, supporting means; a shaft rotatably mounted on said supporting means; first lever means pivotally mounted on said shaft; a first spring means secured at one end to said first lever means and at the other end to said supporting means and urging said first lever means to pivot in one direction; second lever means mounted on said supporting means pivotally about an axis parallel to the axis of said shaft; a second spring means connecting said first lever means and said second lever means and urging said lever means to pivot in said direction; a bar pivoted to said first lever means, and extending parallel to a plane passing through the pivoting axes of said lever means; a slide member slidably mounted on said bar and pivoted to said second lever means; a stop means including a coil spring means mounted on said bar connected at one end thereof with said first lever means, and engaging with the other end thereof said slide member when said second lever means is pivoted in the direction opposite to said direction; a rotary cam member mounted on said supporting means and engaging said second lever means, rocking the same; ratchet wheel means fixedly secured to said shaft; a spring-loaded ratchet pawl means pivotally secured to said first lever means and engaging said ratchet wheel means so that said ratchet wheel means and said shaft are intermittently rotated when said first lever means is pivoted in said opposite direction by said slide member and said coil spring means; a control rod mounted on said supporting means; a collar pivoted to said first lever means and being slidable on said control rod; a stop member fixed on said control rod and engaging said collar so that operation of said control rod results in pivoting of said first lever means and shifting of said stop means to an adjusted position spaced from said one end of said second lever means resulting in a partly inoperative stroke of said second lever means; and means fixedly secured to said shaft and adapted to transmit the intermittent motion thereof to a conveyor.

2. An operating arrangement for a conveyor, comprising in combination, supporting means; a shaft rotatably mounted on said supporting means; first lever means pivotally mounted on said shaft; a sleeve member pivoted to said first lever means; a spring-loaded plunger mounted in said sleeve member; a first spring means secured at one end to said first lever means and at the other end to said supporting means and urging said first lever means to pivot in one direction; second lever means mounted on said supporting means pivotally about an axis parallel to the axis of said shaft; a second spring means connecting said first lever means and said second lever means and urging said lever means to pivot in said direction; a bar slidably mounted on said sleeve member and formed with a notch engaged by said plunger, and extending parallel to a plane passing through the pivoting axes of said lever means; a slide member slidably mounted on said bar and pivoted to said second lever means; a stop means including a coil spring means mounted on said bar connected with one end thereof against said sleeve member, and engaging with the other end thereof said slide member when said second lever means is pivoted in the direction opposite to said direction; a rotary cam member mounted on said supporting means and engaging said second lever means, rocking the same; ratchet wheel means fixedly secured to said shaft; a spring-loaded ratchet pawl means pivotally secured to said first lever means and engaging said ratchet wheel means so that said ratchet wheel means and said shaft are intermittently rotated when said first lever means is pivoted in said opposite direction by said slide member and said coil spring means; a control rod mounted on said supporting means; a collar pivoted to said first lever means and being slidable on said control rod; a stop member fixed on said control rod and engaging said collar so that operation of said control rod results in pivoting of said first lever means and shifting of said stop means to an adjusted position spaced from said one end of said second lever means resulting in a partly inoperative stroke of said second lever means; and means fixedly secured to said shaft and adapted to transmit the intermittent motion thereof to a conveyer.

3. An adjustable operating arrangement for intermittently moving a member comprising, in combination, supporting means; a first and a second lever arm pivotally mounted intermediate the ends thereof on said supporting means at two spaced pivoting points; a bar pivotally mounted on said first lever arm spaced a fixed distance from the pivoting point of the same, and slidably attached to said second lever arm at a distance from the pivoting point of the same which is equal to said fixed distance; first stop means mounted on said bar and preventing turning of said lever arms toward each other beyond parallel direction thereof; urging means permanently tending to turn said first lever arm toward said second lever arm and said second lever arm away from said first lever arm; rocking means for intermittently turning said second lever arm about its pivoting point against the action of said urging means toward said first lever arm so as to engage said first stop means and to thereby rock said bar and said first lever arm; second stop means for limiting turning of said first lever arm toward said second lever arm; and means for adjusting said second stop means so as to adjust the maximum angle of turning of said first lever arm toward said second lever arm under action of said urging means.

4. An adjustable operating arrangement for intermittently moving a member comprising, in combination, supporting means; a first and a second lever arm pivotally mounted intermediate the ends thereof on said supporting means at two spaced pivoting points; a bar pivotally mounted on said first lever arm spaced a fixed distance from the pivoting point of the same, and slidably attached to said second lever arm at a distance from the pivoting point of the same which is equal to said fixed distance; first stop means including a coil spring connected with said first lever arm and mounted on said bar, said first stop means engaging said second lever arm when said first and said second lever arms are parallel; spring means permanently tending to turn said first lever arm toward said second lever arm and said second lever arm away from said first lever arm; cam means for intermittently turning said second lever arm about its pivoting point against the action of said spring means toward said first lever arm so as to engage said first stop means and to thereby rock said bar and said first lever arm; second stop means for limiting turning of said first lever arm toward said second lever arm; and control means for adjusting said second stop means to a position in which said first lever arm is moved away from said second lever arm and said first stop means is spaced from said second lever arm whereby part of the turning stroke of said second lever arm is inoperative and results in a smaller stroke of said first lever means.

5. An adjustable operating arrangement for intermittently moving a conveyor, comprising, in combination, supporting means, first and second lever means pivotally mounted on said supporting means intermediate the ends of said lever means; a bar pivotally connected to one end of said first lever means, and being slidably mounted on one end of said second lever means; a stop mounted on said bar for movement with said first lever means and engaging said one end of said second lever means when said first and second lever means are parallel; spring means connected to and urging said lever means to turn in one direction; cam means engaging said second lever means and turning the same against the action of said spring means in an opposite direction to engage said stop and to rock said first lever means by means of said bar; a control rod mounted on said supporting means; means pivotally securing said first lever means to said control rod so that shifting of said control rod results in pivoting of said first lever means and shifting of said stop to an adjusted position spaced from said one end of said second lever means, resulting in a partly inoperative stroke of said second lever means and in a smaller stroke of said first lever means; and means connected to said first lever means and adapted to transmit the intermittent movement of the same to a conveyor.

6. An adjustable operating arrangement for intermittently moving a conveyor, comprising, in combination, supporting means, first and second lever means pivotally mounted on said supporting means intermediate the ends of said lever means; a bar pivotally connected to one end of said first lever means, and being slidably mounted on one end of said second lever means; a stop mounted on said bar for movement with said first lever means and engaging said one end of said second lever means when said first and second lever means are parallel; spring means connected to and urging said lever means to turn in one direction; cam means engaging said second lever means and turning the same against the action of said spring means in an opposite direction to engage said stop and to rock said first lever means by means of said bar; a control rod mounted on said supporting means; a collar pivoted to said first lever means and being slidable on said control rod; and a stop member fixed on said control rod and engaging said collar so that shifting of said control rod results in pivoting of said first lever means and shifting of said stop to an adjusted position spaced from said one end of said second lever means, resulting in a partly inoperative stroke of said second lever means and in a smaller stroke of said first lever means; and means connected to said first lever means and adapted to transmit the intermittent movement of the same to a conveyor.

FRANCIS LEE.

References Cited in the file of this patent

UNITED STATES PATENTS

| Number | Name | Date |
| --- | --- | --- |
| 1,383,619 | Gray | July 5, 1921 |
| 1,392,720 | Synck et al. | Oct. 4, 1921 |
| 1,843,431 | Neighbor | Feb. 2, 1932 |
| 1,945,125 | Swanson et al. | Jan. 30, 1934 |
| 2,051,885 | Neighbor | Aug. 25, 1936 |
| 2,378,676 | Ambruster | June 19, 1945 |
| 2,486,214 | Seaholm | Oct. 25, 1949 |
| 2,561,755 | Recker | July 24, 1951 |

FOREIGN PATENTS

| Number | Country | Date |
| --- | --- | --- |
| 585,945 | France | Dec. 19, 1924 |